US010561224B2

(12) United States Patent
Comeaux et al.

(10) Patent No.: US 10,561,224 B2
(45) Date of Patent: Feb. 18, 2020

(54) HAIR-COLORING PREDICTIVE TEST SYSTEM AND METHOD

(71) Applicants: Joshua C. Comeaux, Lafayette, LA (US); Thomas Rinehart, New Iberia, LA (US)

(72) Inventors: Joshua C. Comeaux, Lafayette, LA (US); Thomas Rinehart, New Iberia, LA (US)

( * ) Notice: Subject to any disclaimer, the term of this patent is extended or adjusted under 35 U.S.C. 154(b) by 316 days.

(21) Appl. No.: 15/468,103

(22) Filed: Mar. 23, 2017

(65) Prior Publication Data

US 2018/0271259 A1    Sep. 27, 2018

(51) Int. Cl.

| G09B 19/10 | (2006.01) |
|---|---|
| A45D 44/00 | (2006.01) |
| D21H 27/00 | (2006.01) |
| D21H 11/12 | (2006.01) |
| D21H 17/28 | (2006.01) |
| D21H 17/31 | (2006.01) |
| D21H 25/04 | (2006.01) |
| G09B 19/00 | (2006.01) |
| D21H 21/28 | (2006.01) |
| A45D 19/00 | (2006.01) |

(52) U.S. Cl.
CPC .......... *A45D 44/005* (2013.01); *D21H 11/12* (2013.01); *D21H 17/28* (2013.01); *D21H 17/31* (2013.01); *D21H 21/28* (2013.01); *D21H 25/04* (2013.01); *D21H 27/00* (2013.01); *D21H 27/002* (2013.01); *G09B 19/0023* (2013.01); *A45D 19/00* (2013.01)

(58) Field of Classification Search
USPC .......... 434/81, 84, 94, 98, 99, 100, 103, 377
See application file for complete search history.

(56) References Cited

U.S. PATENT DOCUMENTS

| 3,609,886 | A | * | 10/1971 | Vien | A45D 44/005 434/99 |
|---|---|---|---|---|---|
| 4,583,562 | A | * | 4/1986 | Stewart | G09B 19/0076 132/212 |
| 4,776,796 | A | * | 10/1988 | Nossal | A45D 44/005 434/94 |
| 5,316,481 | A | * | 5/1994 | Louise | A45D 44/005 434/98 |
| 5,609,484 | A | * | 3/1997 | Hawiuk | A45D 44/005 434/94 |
| 6,717,673 | B1 | * | 4/2004 | Janssen | G01J 3/46 356/402 |
| 6,824,387 | B2 | * | 11/2004 | Sakai | A45D 44/005 434/102 |
| 6,918,767 | B2 | * | 7/2005 | Ploix | A45D 44/005 434/94 |
| 6,955,261 | B2 | * | 10/2005 | Ploix | A45D 44/005 206/388 |
| 7,758,347 | B2 | * | 7/2010 | Sasaki | A45D 44/005 345/591 |

(Continued)

*Primary Examiner* — Kurt Fernstrom
(74) *Attorney, Agent, or Firm* — Keaty Law Firm LLC

(57) ABSTRACT

A hair-coloring predictive test system and method allowing the pre-application testing of one or more hair dyes by applying the dye to a striated color-base blotter formulated and colored to correspond to a client's hair, either before or after optional lightening, resulting in an example swatch showing the highlights, mid-tones, and shadow tones that will be seen in the corresponding real hair.

23 Claims, 4 Drawing Sheets

(56) References Cited

U.S. PATENT DOCUMENTS

| | | | |
|---|---|---|---|
| 8,721,338 B2 * | 5/2014 | Pagana-Lausch | G09B 23/00 434/94 |
| 2007/0222547 A1 * | 9/2007 | Stahle | A45D 44/005 336/125 |
| 2010/0088036 A1 * | 4/2010 | Goddard-Clark | A61Q 5/065 702/19 |

* cited by examiner

HAIR-COLORING PREDICTIVE TEST SYSTEM AND METHOD

BACKGROUND OF THE INVENTION

This invention provides a hair-coloring predictive test system and method allowing the pre-application testing of one or more hair dyes by applying the dye to a striated color-base blotter formulated and colored to correspond to a client's hair, either before or after optional lightening, resulting in an example swatch showing the highlights, mid-tones, and shadow tones that will be seen in the corresponding real hair.

Coloring hair with hair dyes is frequently an unpredictable process. And even where an experienced hair colorist might be able to accurately forecast the results of this dye on that hair, the client whose hair is being dyed probably lacks such expertise, making it difficult to communicate about desired results prospectively, before the significant step of applying the dye to the hair is done. Paper towels are the industry standard for testing what the color dye finished product will be. Lots of guess work is required, and results are not often consistent. A person's hair has a characteristic base color, which is the natural color of the hair. When hair is bleached or lightened prior to coloring, an undertone remains in the hair. And that undertone will influence whatever hair dye is then applied. The base-color range of from light blonde through brown to black has corresponding undertones from light yellow through orange to red. The base color, or the corresponding undertone for lightened hair, has a significant effect upon the final results obtained from dyeing with any given hair dye. Current testing methods are not accurate, due not having the base colors, and are messy.

Additionally, hair dye characteristics differ from one manufacturer to another. What manufacturers designate "blonde" on the packaging frequently produces different results in a hair-dying process when different brands of hair dyes are used. Furthermore, the same brand may source from different manufactures, which creates the potential to produce a variety of results. Uneducated color testers have trouble interpreting what a train eye can identify often relying on luck when dying a person's hair. As a result, a person desiring a particular shade of "blonde" often has to rely on the expertise of the hair stylist in selecting the type of dye that is likely to produce the result sought by the person. To address this problem, inventors came up with various solutions.

U.S. Pat. No. 5,609,484 was issued on Dec. 21, 1994 to Andrea S. Hawiuk for an "Apparatus for Illustrating and Determining Quantity of Hair Pigment Concentrate to Achieve Desired Hair Color." The patent covers a method and apparatus for illustrating and teaching hair coloring techniques. More particularly, it relates to a method and apparatus for educating a person on hair coloring procedures, and determining in advance appropriate proportions of hair coloring to be added to the basic hair color of a person in order to achieve a desired color effect on the basic hair color. The apparatus of the '484 patent comprises a holder for releasably holding one or more colored filament swatches; a swatch comprising a group of elongated color filaments, held together in parallel relationship to each other, and secured at one end by a filament base.

U.S. Pat. No. 3,609,886 was issued to inventor Vien Andre Vincent and assignee L'Oreal on Oct. 4, 1971 for a "Folder for Determining in Advance the Effect Which a Color-Changing Product Will Have on Natural Hair." The '886 patent discloses a folder, which comprises a back cover sheet carrying all the colors which may be obtained with any group of products, and intermediate sheets, each carrying a natural hair color and a cut-out making visible some of the colors on the back cover. The Vincent patent covers, specifically, a folder comprising a plurality of sheets bound together at one edge to form a booklet, one of said sheets constituting the back cover and carrying a series of representations of various colors that may be produced by using a product on natural hair. The representations on the back cover are arranged in order so that the colors become progressively lighter from one end of the series to the other. Other sheets in the booklet are the intermediate sheets, each of which carries at least one representation of a natural color, with the colors carried by the intermediate sheets becoming progressively lighter from the front of the folder to its back. The intermediate sheets are provided with openings that increase in size from the front of the folder to the back, with the opening in each sheet being so dimensioned as to make visible only the colors on the back cover appropriate for the particularly chosen product.

U.S. Design Pat. No. D276,661 was issued to Michael L. Cafazzo on Dec. 4, 1984 for a "Hair Color Comparison Device" shows a "level finder," which provides instructions for matching swatches of hair with the desired result and then using the correct tint for achieving the desired result.

U.S. Pat. No. 3,278,543 was issued Oct. 11, 1966 to Werner Victor Cohen and assignee E.I. duPont for "Benzothiazole Compounds." The patent discloses the general concept of applying dyes to cotton fiber paper, with an object of the invention being to provide dye intermediates having certain versatility. By substantive intermediates and dyes, the patent means those of the direct dye type that may be applied to paper pulp, or to cotton fiber, for example, without the use of rosin size and alum in the case of paper pulp.

U.S. Pat. No. 4,583,562, issued Dec. 12, 1983 to Elliott B. Stewart, covers a "Method of Testing Hair Strands Using Kit." The patent discloses a method of testing a plurality of hair strands (locks) with chemical formulations, either with cut and taped (at root end) hair strands, or with hair strands wrapped on a rod or roller, securely fastened in the clip of a small folding clipboard Tester. The apparatus comprises a clip at the top of a dark-colored inside back surface of the Tester for testing, examining and comparing hair strand samples, and a vertically hinged light-colored front, for when this light color facilitates examination. There is a ½-inch space between the clip and cover to lift strands onto the cover while still fastened in the clip. The method includes keeping records of the multiple strands, clients, tests, products, formulations, timings, desires, and results, such that a complete multiple Hair Test Record Card is created, its reverse side also including a release or waiver, which is incorporated in a transparent pocket on the inside back of the cover. A pen or pencil holder, and VELCRO pads to fasten the Tester open, are incorporated to protect cards when washing hair strands at sink faucets, or when the client is reading and signing the release. Testing may involve coloring, bleaching, or dye removing, or hair relaxing, straightening, or permanent waving, with the test rod and roller. Some tests may require that strands be warmed or blow-dried, so the work area below the clip is constructed of a laminate sufficient to withstand such heating.

U.S. Pat. No. 5,316,481, issued to inventors John Louise and Thomas Rushing and assigned to Clairol, Inc. on May 31, 1994, covers a "System for Displaying and Selecting Hair Dye Shades." The patent discloses a system for displaying and selecting, a process for selecting, and a device for selecting hair dye shades that allow the consumer to make a knowledgeable and informed hair dye selection. The system includes a horizontal or vertical axis along which hair dyes are arranged by similar colors and shades, and another axis, perpendicular to the first, along which hair dyes are arranged by length of duration of effect. The hair dye shade selector comprises color samples that each represent the hair color that will result when hair of a particular color is treated with a particular hair dye. The system also provides for on-self consumer education and instruction materials regarding the hair dye, display system indicators, and packaging indicators. The '481 patent discloses that the color samples are created by dividing natural hair colors into several categories, such as light/medium blonde, dark blonde, light brown, medium brown, dark brown, and black. Hair swatches representing each of these categories are then separately dyed with one of from several to all shades of from several to all types of hair dye that will be displayed on the retail shelf corresponding to the hair dye shade selector.

U.S. Pat. No. 5,217,744 was issued on Jun. 8, 1993 to Frederick N. Little, Jr. for a "Paint Color Testing Method." The patent covers a kit and method for testing the color of paints to be applied to painted surfaces having primers or sealers thereon to determine if a paint color matches that of a painted surface. Preferably, the kit comprises a plurality of testing members removably mounted thereon or therein. The testing members have different primers or sealers thereon corresponding to those on different known painted surfaces. When a paint is to be applied to an area of a specific painted surface, the paint is first applied to one of the testing members having thereon the same primer or sealer as that on the painted surface. The painted testing member then is moved to a position adjacent the painted surface to compare the color of the paint on the testing member to that of the painted surface.

U.S. Pat. No. 6,824,387 was issued on Nov. 30, 2004 to inventors Masahiko Sakai et al. and assignee Kao Corporation, and covers a "Mirror for Checking Dyed Hair Color." The mirror has a mirror and a colored filter formed on part or the whole of the surface of the mirror. The colored filter is formed such that the color of the reflected image of hair from the colored filter is the same as the dyed hair color for when the hair has been dyed with a particular hair dye. By using this mirror for checking dyed hair color, it is possible to easily predict hair color after dying for any given initial hair color, thus making it possible to easily select a hair dye for obtaining a desired dyed hair color.

SUMMARY OF THE INVENTION

This invention provides a hair-coloring predictive test system and method allowing the pre-application testing of one or more hair dyes by applying the dye to a striated color-base blotter formulated and colored to correspond to a client's hair, either before or after optional lightening, resulting in an example swatch showing the highlights, mid-tones, and shadow tones that will be seen in the corresponding real hair.

BRIEF DESCRIPTION OF THE DRAWINGS

Reference will now be made to the drawings, wherein like parts are designated by like numerals, and wherein.

DETAIL DESCRIPTION OF THE INVENTION

A base hair color is known to the professional hair colorist as the foundation color for lightening or darkening the natural human hair. A base hair color needs to be added to a color formula for successful results. For instance, when a person with dark hair wishes to lightened her hair or add light brown highlights, a proper hair dye base color is needed to lift the hair to a brown shade before highlights can be added. If a gray-haired person wishes to become a redhead with golden or copper highlights, she will first need to establish a red tone base color prior to lightening the hair and adding the spicy highlights. Sometimes, a person does not wish to drastically change her hair but rather add warmth and highlights. For instance, an ash blonde wishes to become a light blonde. In order to achieve the blonde results, the person will need a lighter blonde base color before adding the warm blonde tones. An experienced colorist will add the required base color to the formula, ensuring a positive outcome.

The present invention provides a system for pre-testing various hair dyes against base color blotters or pads prior to applying the dye to natural human hair. The blotters have been colored in base colors, such as yellow, red, orange-red, brown, etc. The color-base blotters are formed from a material selected from the group consisting of a natural fabric, a synthetic fabric, linen canvas, watercolor paper, striated paper, laid paper, matboard, fabric, cellulose-containing pressed and rolled medium, wooden products and veneers and mixtures thereof, said blotters defining the surface for applying test hair color dyes. Thee color-base blotters are porous and moisture absorbent.

The colors of the color map containing a plurality of blotters are based in part on a histogram of the most popular hair colors, as used by stylists. The color map colors are not exact duplicates of the original hair colors of the user. Rather, the "color map color" is a representation of the original hair color based upon the original hair color's undertone, which is the basis of hair color, with optional pre-lightening of the hair. By altering the histogram of original hair colors in this manner, it ensures that the dye, when applied to the color map, will react with the color map color in a way that mimics the reaction of hair dye when applied to actual hair of a user.

Figure 1:
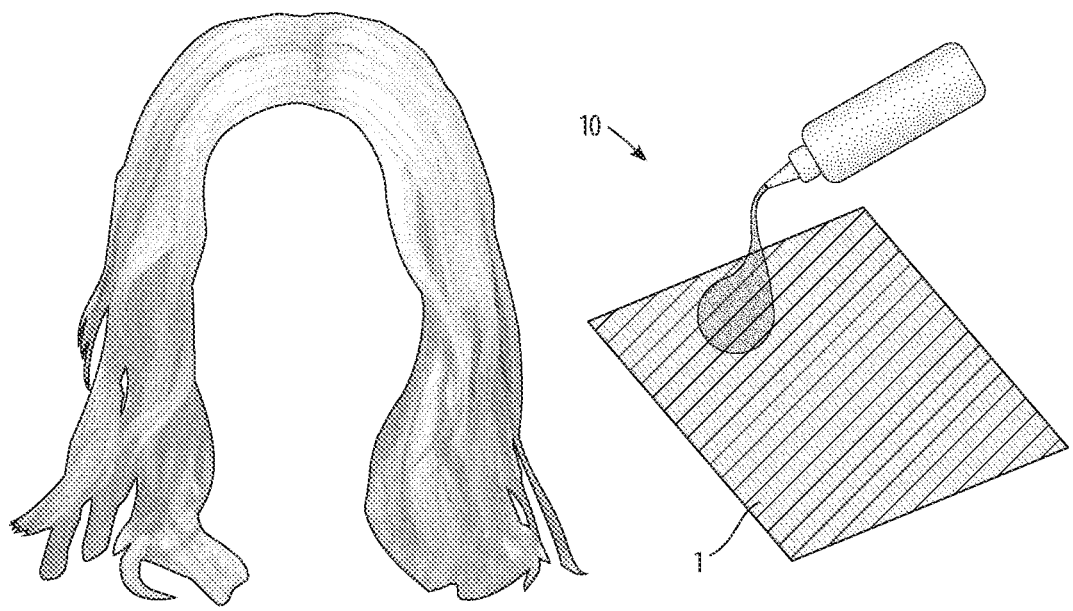
FIG. 1 is a schematic view of the hair-coloring predictive test system of the invention in use.

Referring now to FIG. 1 and all of the figures generally, the hair-coloring predictive test system 10 of the invention is shown. The hair-coloring predictive test system 10 provides a variety of striated color-base blotters 1 which match various color-bases of hair, allowing the testing of prospective hair-coloring dyes upon the appropriate striated color-base blotter 1, with the resulting test-dyed blotter showing the variety of highlights, mid-tones, and shadow tones that result from applying dye to actual hair of the corresponding color base.

Figure 2:
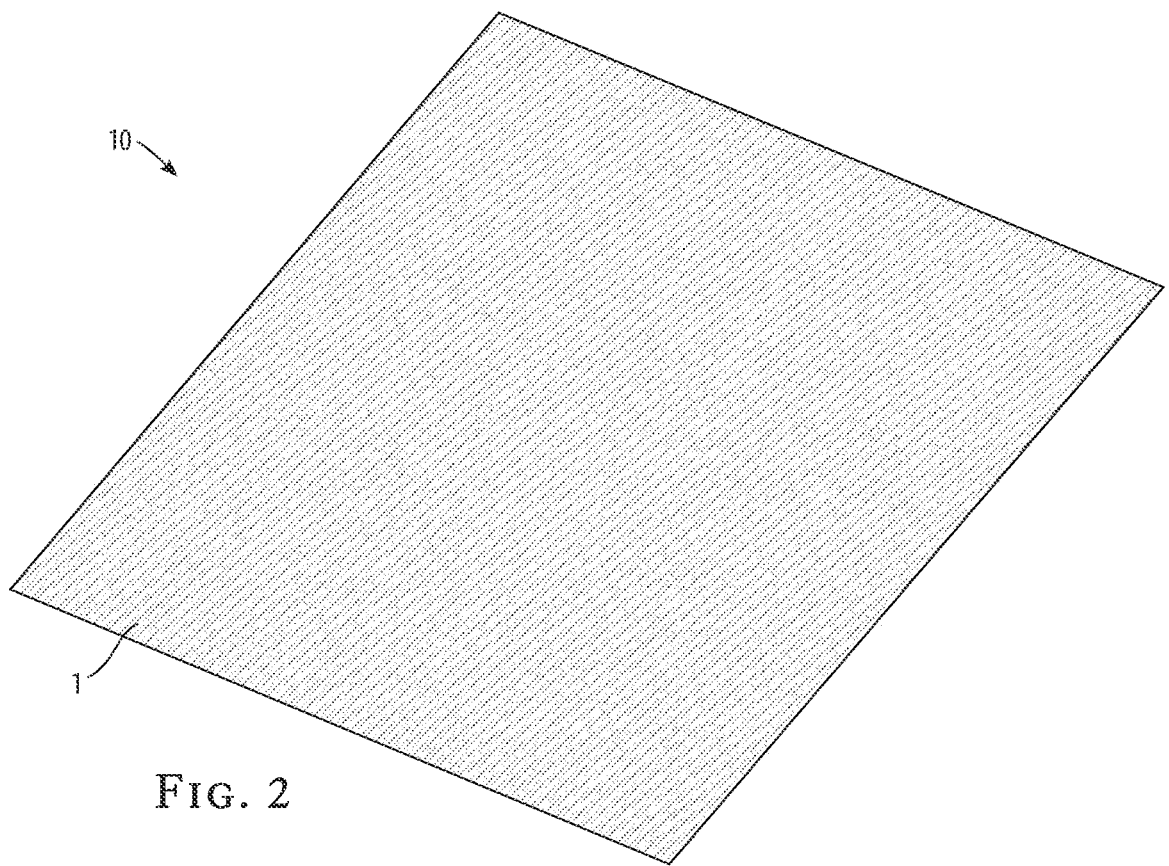
FIG. 2 is an axonometric view of the striated color-base blotter of the hair-coloring predictive test system of the invention.
Figure 3:
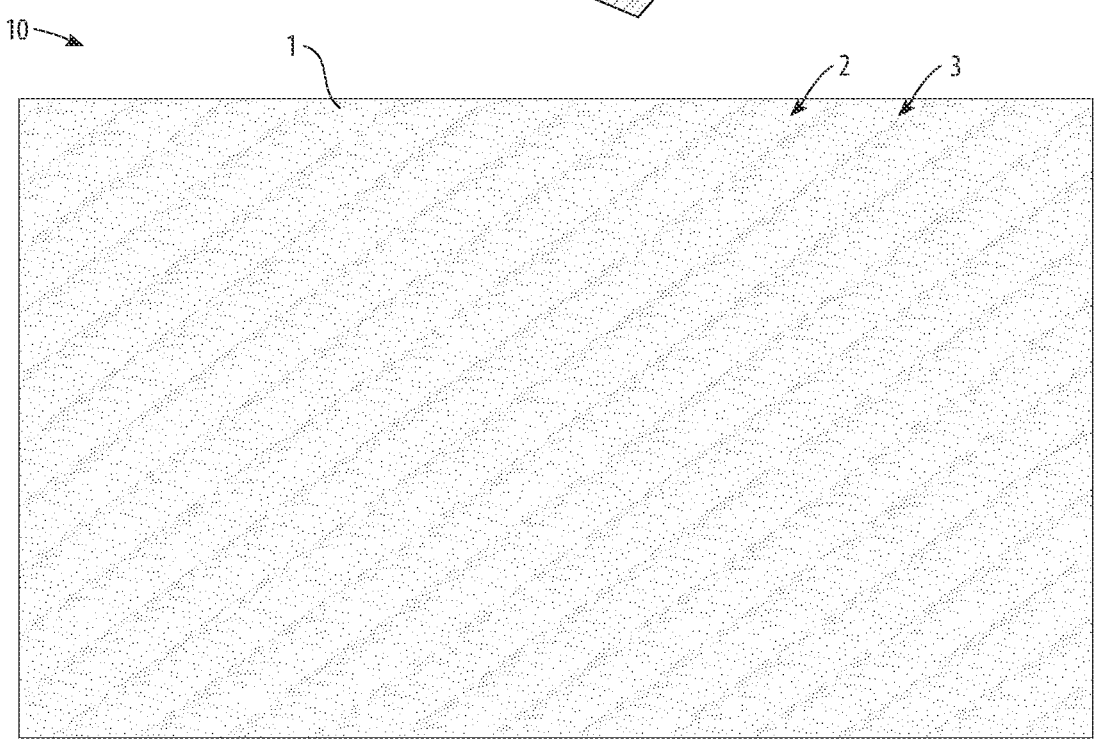
FIG. 3 is a detailed view of the striated color-base blotter of the hair-coloring predictive test system of the invention.

Referring to FIG. 2 & FIG. 3, each striated color-base blotter 1 is essentially a piece of laid paper made from cellulose plant fibers in the form of a paper pulp. The three-dimensional configuration of the "right" side of the striated color-base blotters results from the paper being formed face-down above a sieve or mesh. The right side of the striated color-base blotter 1 has pronounced lines of high, or highlight area 2, and of low, or shadow area 3, and several intermediate gradations resulting from the general roughness of the paper. In use, the high, or highlight areas 2 will catch and reflect more light, and will appear lighter, corresponding to highlights in the hair. The low, or shadow areas 3 will receive and reflect less light, as will the intermediate gradations, corresponding to the shadow tones and mid-tones of the hair.

The laid-paper-making process results in a striated color-base blotter 1 that is more flat on its wrong side than on its right side, which is molded by the sieve or mesh. Consequently, the total thickness behind the high, or highlight areas 2 is thicker than under the low, or shadow areas 3. When dye is applied to the face-up right side of the striated color-base blotter 1, the dye tends to pool in the shadow areas 3 after partially running off of the highlight areas 2. Additionally, the face of the highlight areas 2 has a greater thickness of absorbent material behind it, and the absorbent material can draw some of the dye away from the face of the highlight areas 2.

The pulp for making the striated color-base blotters 1 is formulated to mimic some of the relevant characteristics of hair, which is a protein fiber. The relevant characteristics are the absorption or uptake of dye, and the surface characteristics affecting reflection and diffraction of light. It is useful to have cotton or linen fiber as a significant portion of the cellulose pulp used to make the striated color-base blotters 1. Useful additives or treatments can be applied after the initial forming of the striated color-base blotters 1, such as the application of a starch or gum such as cornstarch or gum arabic, or heating or polishing, in order to obtain the desired absorption and surface characteristics.

The color-base dyes used in making the striated color-base blotters 1 are chosen based upon the common hair colors normally seen, and are formulated to have the same undertone as the corresponding real hair. Therefore the undertone will have essentially the same effect when the dye is applied to the striated color-base blotter 1 as it has on the real hair. If the striated color-base blotters 1 are made up and then treated with an additive or a process afterward, then the color-base dyes can be applied to the untreated paper before the final treatment. In this way, for instance, the color-base dye used in the manufacturing process might be very readily absorbed into the striated color-base blotters 1 during the manufacturing process, and then a subsequent treatment might both fix the color-base dye into the striated color-base blotter, and also provide a more hair-like absorbency and surface characteristics in the finished striated color-base blotter 1.

Figure 4:
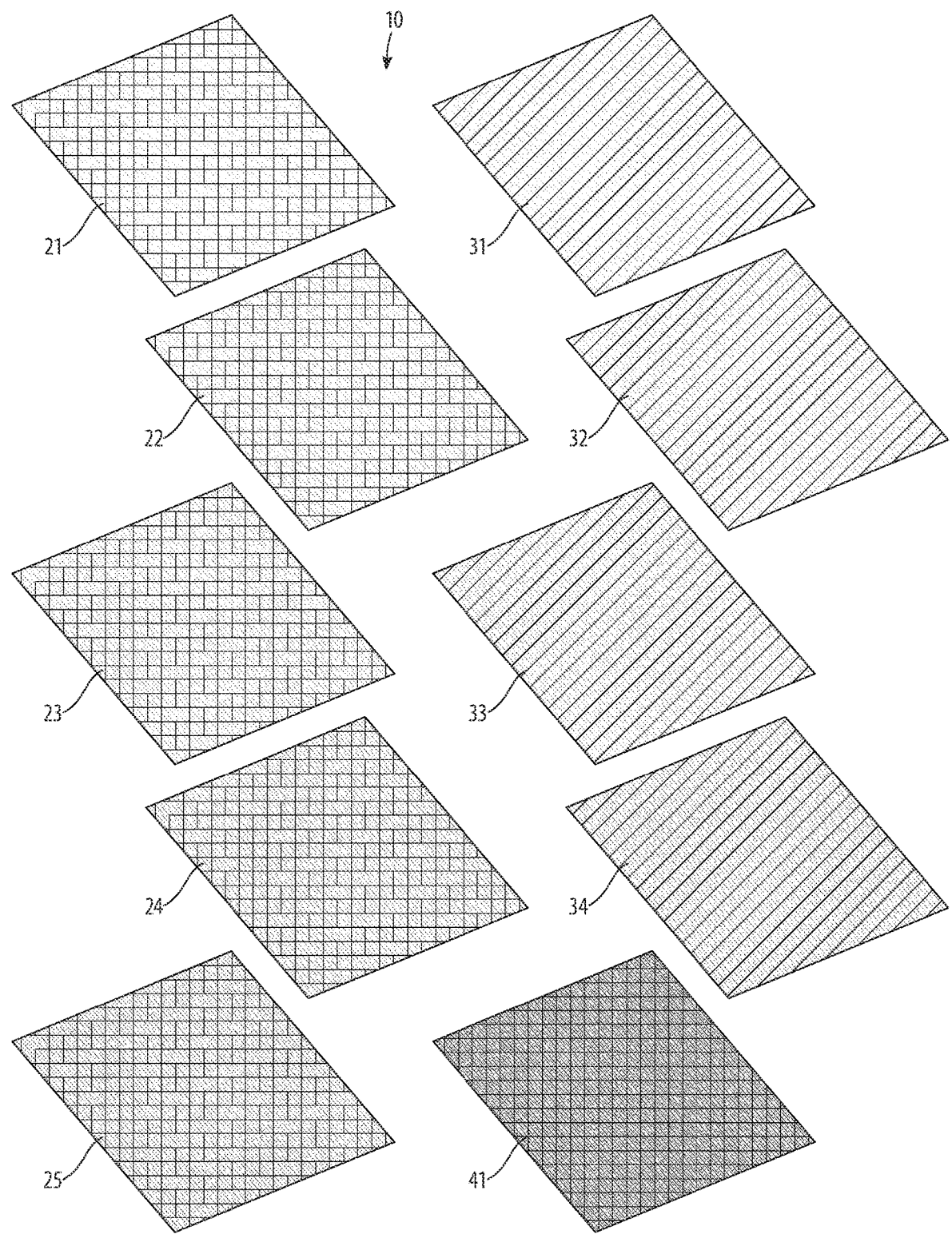
FIG. 4 is a schematic view of the graded base colors of the striated color-base blotters of the hair-coloring predictive test system of the invention.

Referring to FIG. 4, in an embodiment of the hair-coloring predictive test system 10, ten graded base colors of striated color-base blotters 1 are provided, corresponding to the hair-color bases normally seen. The colors are lightest blonde 21, very light blonde 22, light blonde 23, medium blonde 24, dark blonde 25, light brown 31, medium brown 32, dark brown 33, darkest brown 34, and black 41. In another embodiment of the hair-coloring predictive test system 10 the striated color-base blotters 1 are also provided in the undertone colors corresponding to the normal base colors, which allows testing of the dye on bleached or lightened hair. Such an arrangement could be useful in determining in advance whether dye should be applied to the natural base color of the hair or whether the hair should be lightened first.

Figure 5:
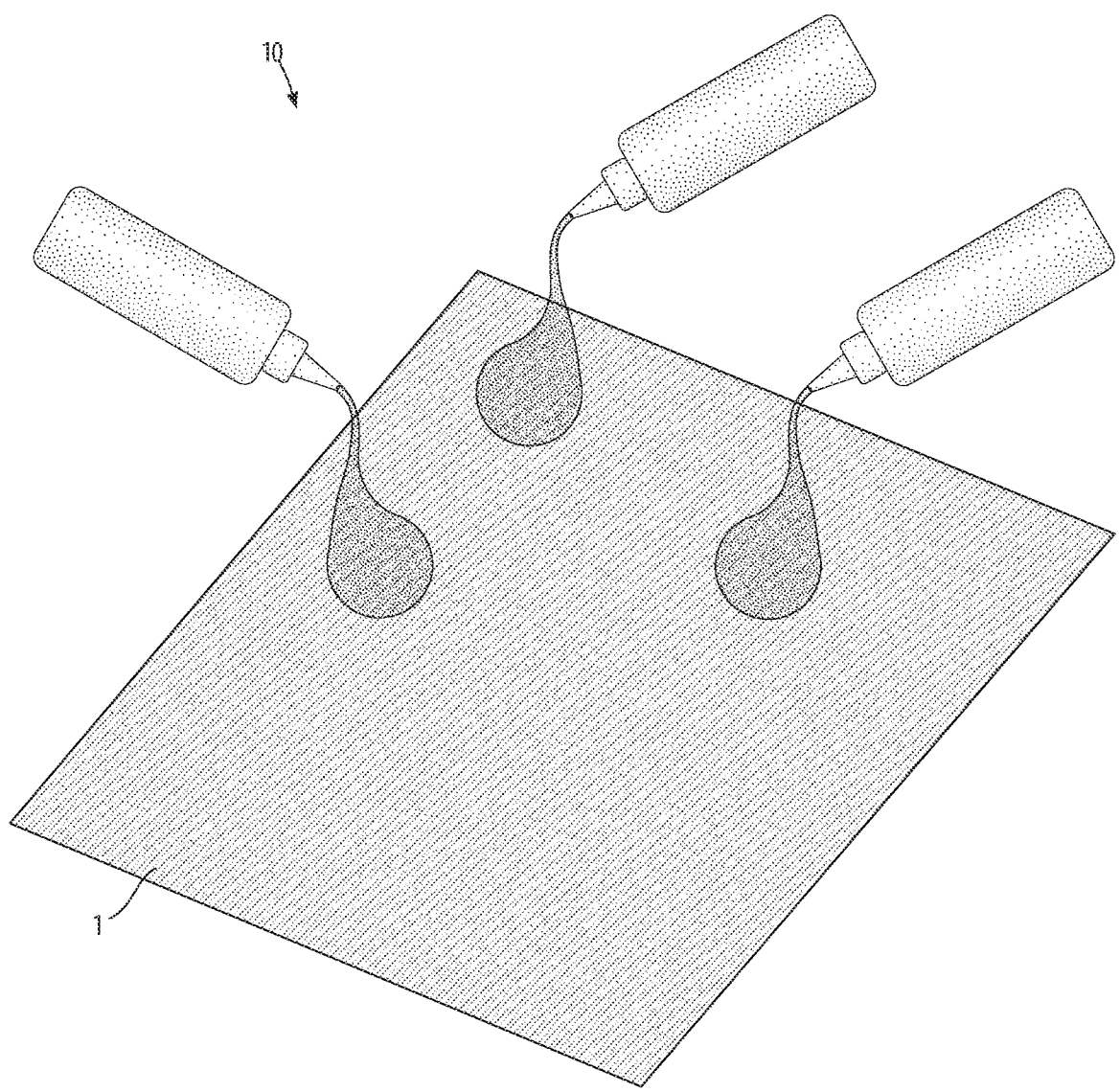
FIG. 5 is a schematic view of the striated color-base blotter of the hair-coloring predictive test system of the invention, in use for testing more than one hair dye.

Referring to FIG. 5, in an embodiment of the hair-coloring predictive test system 10 the striated color-base blotters 1 are made sufficiently large to accommodate the testing of more than one hair dye. The hair dye can be deposited on the blotter surface using a brush, by dripping, or by other desired method. Once absorbed and dried, the color swatch can be evaluated by the user and a decision can be made to use a particular hair dye on the person's hair.

By having various base color blotters, a user can approximate what the final color will be, thus making a hair-coloring process significantly more predictable. Different hue color-base blotters can be used for testing same color dyes. A professional colorist can present the test results to a client and select the optimal color dye for achieving the desired result.

In is envisioned that the instant invention is not limited to hair dye, but is also applicable to any situation wherein color will be applied on top of a preexisting base color. For example, the color map could be applicable to repainting walls, varnishing furniture, and so forth.

Many other changes and modifications can be made in the system and method of the present invention without departing from the spirit thereof. I therefore pray that my rights to the present invention be limited only by the scope of the appended claims.

We claim:

1. A hair-coloring predictive test system comprising:
   a plurality of striated color-base blotters each having a color corresponding to a natural-hair base color, each being composed of laid paper pulp, each having a striated surface having highlight areas and shadow areas, and each adapted to display absorbed samples of hair dye in a range of highlights, mid-tones, and shadow tones closely matching real hair.

2. The hair-coloring predictive test system of claim 1, where said laid paper pulp is formulated to closely match the absorbency and surface reflection and diffraction qualities of real hair.

3. The hair-coloring predictive test system of claim 1, wherein said striated color-base blotters are treated, during manufacture, with an additive adapted to make the absorbency and surface reflection and diffraction qualities more closely match that of real hair.

4. The hair-coloring predictive test system of claim 1, wherein said striated color-base blotters are treated, during manufacture, with a starch.

5. The hair-coloring predictive test system of claim 1, wherein said striated color-base blotters are treated, during manufacture, with a gum.

6. The hair-coloring predictive test system of claim 1, wherein said striated color-base blotters are treated, during manufacture, with a finishing process adapted to make the absorbency and surface reflection and diffraction qualities more closely match that of real hair.

7. The hair-coloring predictive test system of claim 1, wherein said striated color-base blotters are treated, during manufacture, with a finishing process of hot rolling.

8. The hair-coloring predictive test system of claim 1, where said color corresponding to a natural-hair base color further comprises a dye having the correct undertones corresponding to real hair.

9. The hair-coloring predictive test system of claim 1, where said laid paper pulp further comprises pulp containing cotton fibers.

10. The hair-coloring predictive test system of claim 1, where said laid paper pulp further comprises pulp containing linen fibers.

11. A hair-coloring predictive test method comprising:
providing a plurality of striated color-base blotters each having a color corresponding to a natural-hair base color, each being composed of laid paper pulp, each having a striated surface having highlight areas and shadow areas, and each adapted to display absorbed samples of hair dye in a range of highlights, mid-tones, and shadow tones closely matching real hair;
choosing a striated color-base blotter corresponding to the natural hair color at issue;
applying hair dye to said striated color-base blotter;
observing and evaluating the color resulting from application of hair dye to the striated color-base blotter having a color corresponding to a natural-hair base color.

12. The hair-coloring predictive test method of claim 11, further comprising a paper pulp formulated to closely match the absorbency and surface reflection and diffraction qualities of real hair.

13. The hair-coloring predictive test method of claim 11, further comprising treatment, during manufacture, of said striated color-base blotters with an additive adapted to make the absorbency and surface reflection and diffraction qualities more closely match that of real hair.

14. The hair-coloring predictive test method of claim 11, further comprising treatment, during manufacture, of said striated color-base blotters with a starch.

15. The hair-coloring predictive test method of claim 11, further comprising treatment, during manufacture, of said striated color-base blotters with a gum.

16. The hair-coloring predictive test method of claim 11, further comprising treatment, during manufacture, of said striated color-base blotters with a finishing process adapted to make the absorbency and surface reflection and diffraction qualities more closely match that of real hair.

17. The hair-coloring predictive test method of claim 11, further comprising treatment, during manufacture, of said striated color-base blotters with a finishing process of hot rolling.

18. The hair-coloring predictive test method of claim 11, where said color corresponding to a natural-hair base color further comprises a dye having the correct undertones corresponding to real hair.

19. The hair-coloring predictive test method of claim 11, where said laid paper pulp further comprises pulp containing cotton fibers.

20. The hair-coloring predictive test method of claim 11, where said laid paper pulp further comprises pulp containing linen fibers.

21. A method of predicting results of coloring hair of a person, comprising the steps:
providing a plurality of color-base blotters, each blotter having a color corresponding to a human hair base color, each blotter defining a surface for applying hair dyes;
selecting a color-base hair blotter most closely approximating base color of the person;
applying one or more hair dyes to the surface of the selected blotter, while creating a predictive color map for coloring the person's hair.

22. The method of claim 21, wherein the color-base blotters are formed from a material selected from the group consisting of a natural fabric, a synthetic fabric, linen canvas, watercolor paper, striated paper, laid paper, matboard, fabric, cellulose-containing pressed and rolled medium, wooden products and veneers and mixtures thereof.

23. The method of claim 21, wherein said color-base blotters are porous and moisture absorbent.

* * * * *